(12) United States Patent
Fukuhara et al.

(10) Patent No.: US 6,839,132 B2
(45) Date of Patent: Jan. 4, 2005

(54) ABERRATION MEASURING METHOD OF PROJECTION OPTICAL SYSTEM

(75) Inventors: Kazuya Fukuhara, Tokyo (JP); Takashi Sato, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 10/361,685

(22) Filed: Feb. 11, 2003

(65) Prior Publication Data

US 2003/0184736 A1 Oct. 2, 2003

(30) Foreign Application Priority Data

Feb. 12, 2002 (JP) ........................................ 2002-034258

(51) Int. Cl.⁷ .................................................. G01B 9/00
(52) U.S. Cl. ...................... 356/124; 356/125; 351/211; 351/221; 355/55; 355/52
(58) Field of Search .............................. 356/124, 124.4, 356/125, 127; 250/559.29, 559.3; 351/211, 221; 355/55, 52, 69

(56) References Cited

U.S. PATENT DOCUMENTS

| | | | |
|---|---|---|---|
| 5,424,552 A | * 6/1995 | Tsuji et al. | ........... 250/548 |
| 5,615,006 A | 3/1997 | Hirukawa et al. | |
| 6,130,747 A | 10/2000 | Nomura et al. | |
| 6,248,486 B1 | 6/2001 | Dirksen et al. | |
| 6,317,198 B1 | 11/2001 | Sato et al. | |
| 6,674,511 B2 * | 1/2004 | Nomura et al. | ........... 355/55 |

OTHER PUBLICATIONS

Shannon, R.R. et al., "Applied Optics and Optical Engineering", Academic Press, Inc., vol. XI, pp. 12–15.

* cited by examiner

*Primary Examiner*—Frank G. Font
*Assistant Examiner*—Roy M. Punnoose
(74) *Attorney, Agent, or Firm*—Finnegan, Henderson, Farabow, Garrett & Dunner, L.L.P.

(57) ABSTRACT

There is disclosed aberration measuring method of a projection optical system comprising collectively irradiating the finite region of the photomask in which a diffraction grating is formed with the illuminating light emitted from secondary light source having point sources, projecting 0th-order and 1st-order diffracted lights to first and second measurement planes conjugated with the secondary light source by using a projection optical system, respectively, the 0th-order and 1st-order diffracted lights being passed through the photomask, measuring a relation of projected positions in the first and second measurement planes between the 0th-order diffracted light and 1st-order diffracted light of the light emitted from one arbitrary point source, respectively, obtaining lay aberration concerning the light emitted from the point source on the basis of the obtained two relations of projected positions.

18 Claims, 13 Drawing Sheets

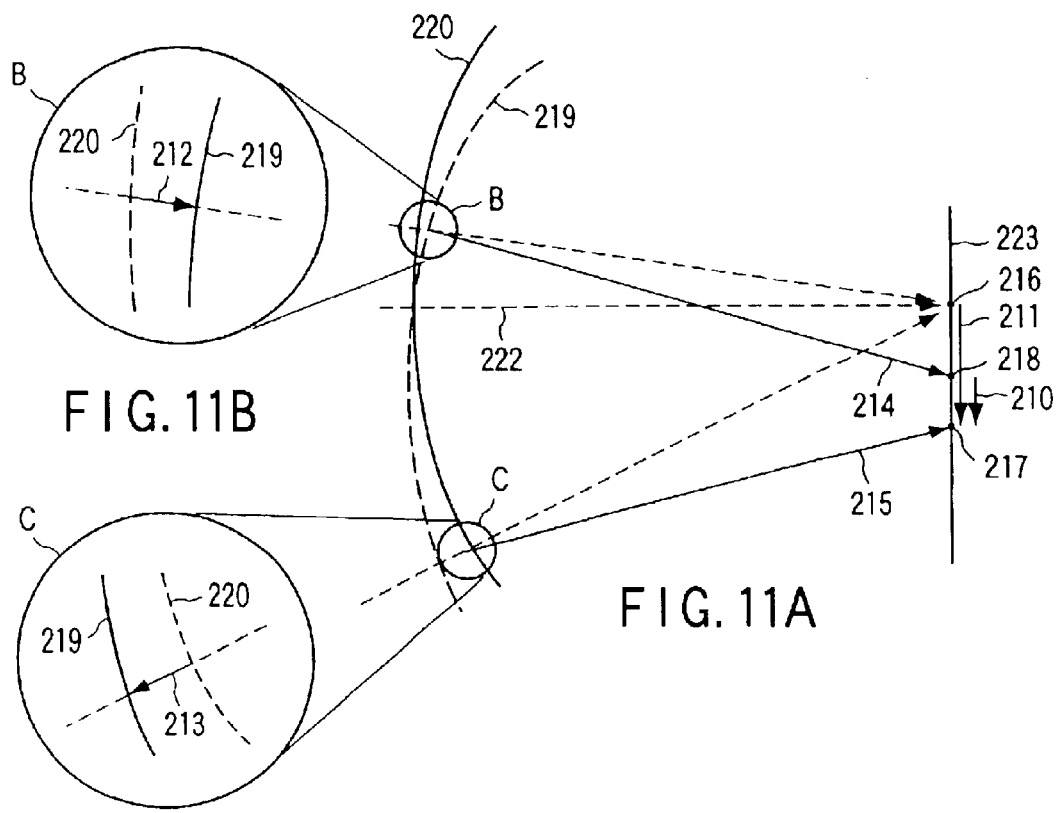
FIG. 11B
FIG. 11A
FIG. 11C
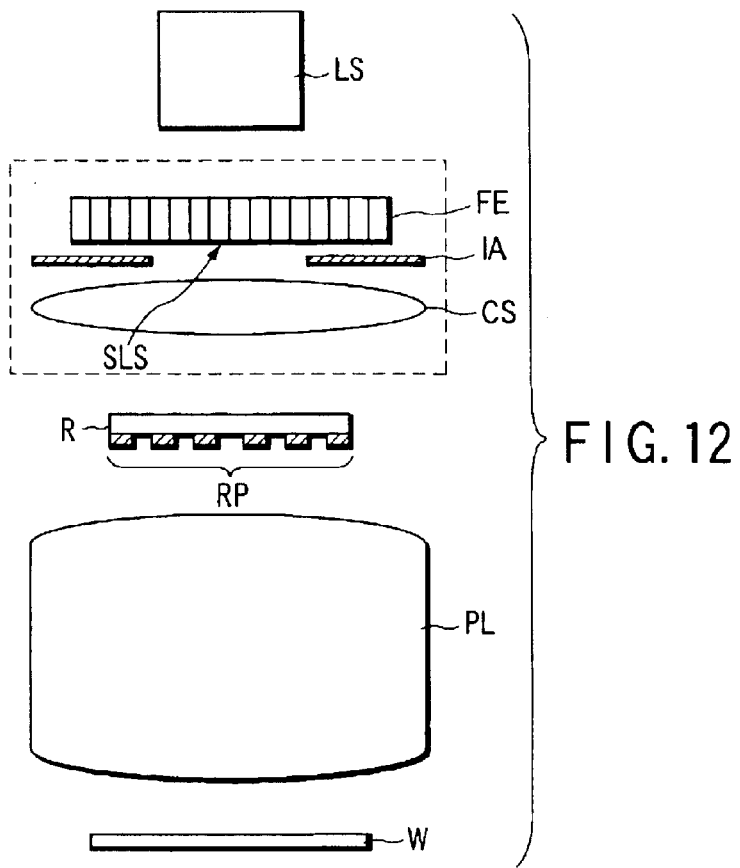
FIG. 12

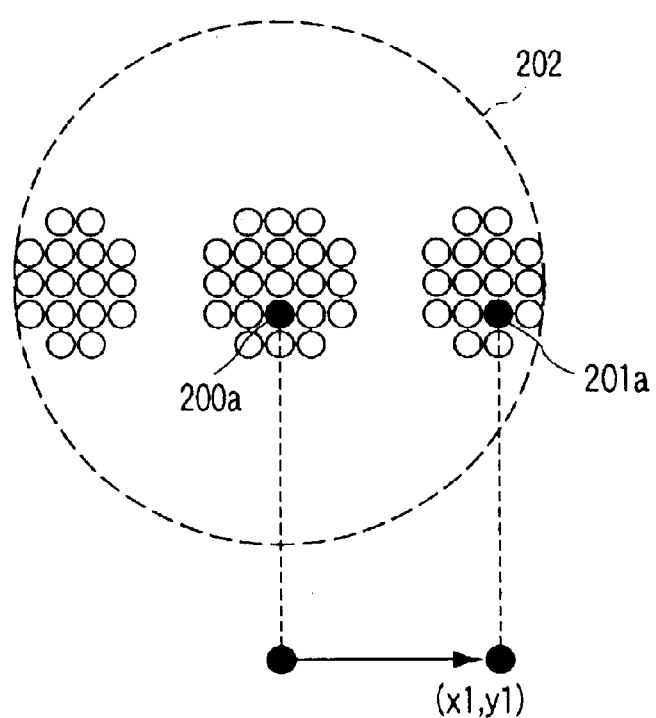
F I G. 20
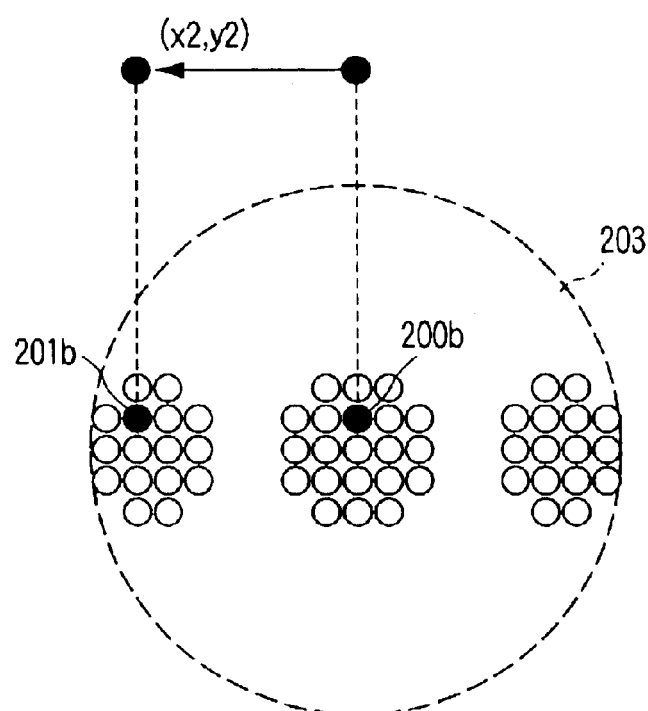
F I G. 21

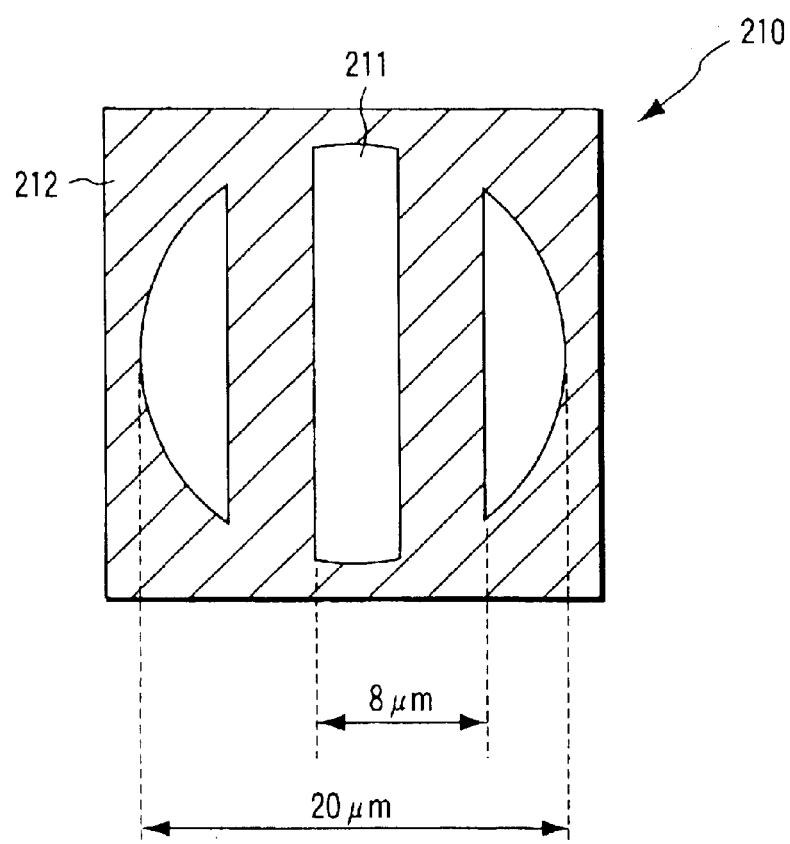
F I G. 22
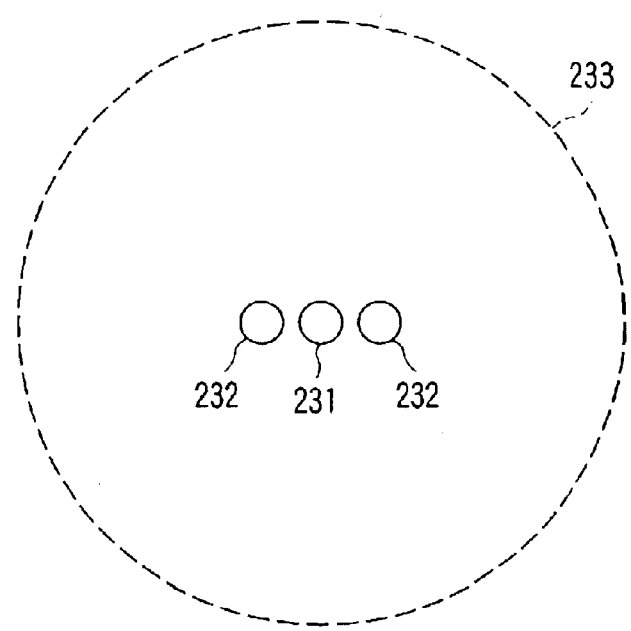
F I G. 23

ABERRATION MEASURING METHOD OF PROJECTION OPTICAL SYSTEM

CROSS-REFERENCE TO RELATED APPLICATIONS

This application is based upon and claims the benefit of priority from the prior Japanese Patent Application No. 2002-34258, filed Feb. 12, 2002, the entire contents of which are incorporated herein by reference.

BACKGROUND OF THE INVENTION

1. Field of the Invention

The present invention relates to a measuring method of an optical system of an exposure apparatus for use in a lithography process, in semiconductor device manufacturing, particularly to an aberration measuring method of a projection optical system.

2. Description of the Related Art

There have been proposed various methods of simply measuring aberration of a projection optical system of a reduced projection type exposure apparatus for use in manufacturing a semiconductor device without disassembling the apparatus. The aberration can roughly be classified into two types. One is aberration which is referred to as odd function aberration and which causes position deviation of an image. Coma aberration is typical odd function aberration. The other is even function aberration. The even function aberration is aberration which causes a deviation of focus distance of the image. A spherical aberration is typical even function aberration.

In a typical method of using a silicon wafer coated with photoresist and a photomask to simply measure the odd function aberration without disassembling the exposure apparatus being operated, a method is disclosed in Jpn. Pat. Appln. KOKAI Publication No. 11-237310. This method generally has an advantage that an overlay inspection apparatus or optical microscope for use in an inspection process of semiconductor device manufacturing can be used to simply obtain aberration amount. However, a limitation of a measurable region described hereinafter is clarified. That is, when a diffraction angle is reduced and a 2nd-order or higher-order diffracted light contributes to image forming (when a three-beam interference condition is not established), the aberration cannot be measured. In other words, there has been a problem that wavefront aberration amount cannot be measured in a region in the vicinity of a middle of a projection pupil of a projection optical system.

BRIEF SUMMARY OF THE INVENTION (1) According to the present invention, there is provided aberration measuring method of a projection optical system, comprising: preparing an exposure apparatus comprising a light source, an illuminating optical system which divides a light from the light source into a plurality of point sources to form a secondary light source and which guides an illuminating light from the secondary light source into a finite region of a photomask, and a projection optical system which transfers a reduced projected image of a transmitted light generated through a pattern disposed in the photomask onto a wafer; collectively irradiating the finite region of the photomask in which a diffraction grating is formed with the illuminating light; projecting a 0th-order diffracted light and 1st-order diffracted light passed through the photomask onto a first measurement plane conjugated with the secondary light source by using the projection optical system; measuring a relation of projected positions in the first measurement plane between the 0th-order diffracted light and 1st-order diffracted light of the light emitted from one arbitrary point source in the secondary light source; projecting the 0th-order diffracted light and 1st-order diffracted light onto a second measurement plane which is conjugated with the secondary light source and in which the position of the light of an optical axis direction is different by using the projection optical system; measuring the relation of the projected positions of the second measurement plane between the 0th-order diffracted light and 1st-order diffracted light of the light emitted from the point source; and obtaining lay aberration concerning the light emitted from the point source on the basis of the obtained two relations of projected positions.

(2) According to the present invention, there is provided aberration measuring method of a projection optical system, comprising: preparing an exposure apparatus comprising a light source, an illuminating optical system which divides a light from the light source into a plurality of point sources to form a secondary light source and which guides an illuminating light from the secondary light source into a finite region of a photomask, and a projection optical system which transfers a reduced projected image of a transmitted light generated through a pattern disposed in the photomask onto a wafer; collectively irradiating the finite region of the photomask in which a diffraction grating is formed with the illuminating light; projecting a 0th-order diffracted light and 1st-order diffracted light passed through the photomask onto a first measurement plane conjugated with the secondary light source by using the projection optical system; measuring a relation of projected positions in the first measurement plane between the 0th-order diffracted light and 1st-order diffracted light of the light emitted from one arbitrary point source in the secondary light source; projecting the 0th-order diffracted light and 1st-order diffracted light onto a second measurement plane which is conjugated with the secondary light source and in which the position of the light of an optical axis direction is different by using the projection optical system; measuring the relation of the projected positions of the second measurement plane between the 0th-order diffracted light and 1st-order diffracted light of the light emitted from the point source; obtaining lay aberration concerning the light emitted from the point source on the basis of the obtained relation of two-projected positions; and obtaining wavefront aberration from the obtained lay aberration.

BRIEF DESCRIPTION OF THE SEVERAL VIEWS OF THE DRAWING

FIGS. 11A to 11C are explanatory views showing a method of obtaining a difference between optical path differences of a 0th-order diffracted light and 1st-order diffracted light;

FIG. 12 is a diagram showing a schematic constitution of an exposure apparatus in which the pattern drawn in the photomask is reduced/projected on the substrate according to a first embodiment;

FIG. 20 is a diagram showing the pattern formed on a photosensitive substrate disposed in the defocus position +d by the diffracted light image of a vertical pattern;

FIG. 21 is a diagram showing the pattern formed on the photosensitive substrate disposed in the defocus position −d by the diffracted light image of the vertical pattern;

FIG. 22 is a diagram showing the photomask for use in measuring lay aberration in the vicinity of a pupil middle; and FIG. 23 is a diagram showing a photoresist pattern obtained by exposure using the photomask for use in measuring the lay aberration in the vicinity of the pupil middle.

DETAILED DESCRIPTION OF THE INVENTION (Principle of Aberration Measuring Method of Projection Optical System)

A technique will be described for making possible wavefront aberration measurement even in a region in which it was previously impossible and which is in the vicinity of a lens middle with respect to a broader range of a projection pupil of a projection optical system.

Figure 1:
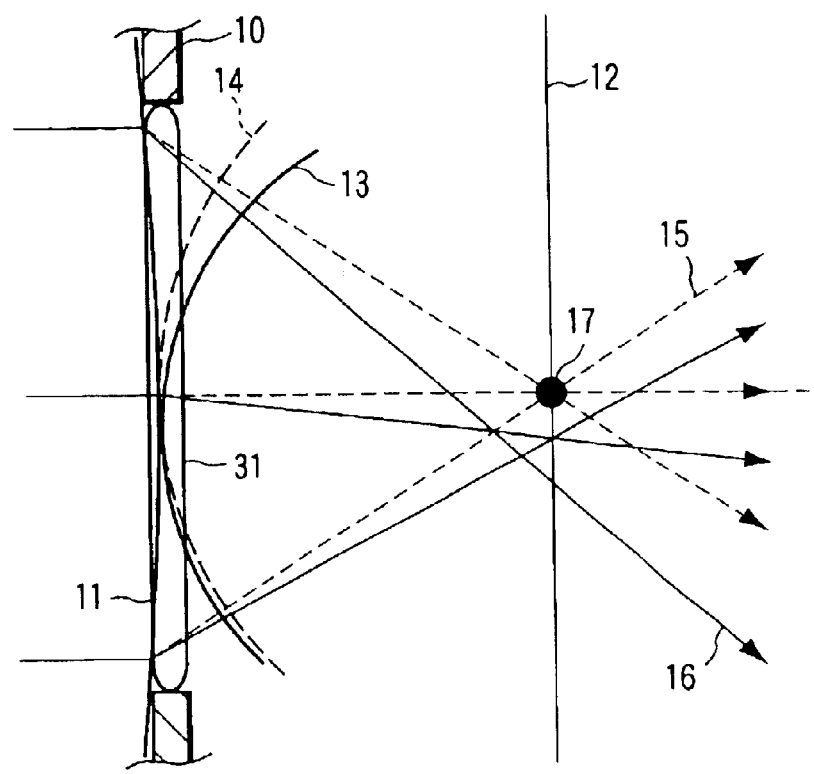
FIG. 1 is a diagram showing that a light diffracted through a pattern on a photomask and incident upon a projection optical system is passed through a projection pupil to reach a substrate.

The optical system of an exposure apparatus has aberration, and therefore a focus deviation, pattern position deviation, or deformation which is dependent on a pattern size is generated. FIG. 1 is a diagram showing that a light diffracted through a pattern on a photomask and incident upon the projection optical system is passed through the projection pupil to reach a substrate. In FIG. 1, reference numeral 10 denotes a diaphragm which defines a projection pupil 31 of the projection optical system. A surface surrounded by the diaphragm 10 is the projection pupil 31. Moreover, in FIG. 1, reference numeral 11 denotes a projection optical system surface, 12 denotes an ideal image plane, 13 denotes a wavefront in a case in which there is aberration, 14 denotes a wavefront (ideal wavefront) in a case in which there is no aberration, 15 denotes a diffracted light without any aberration, 16 denotes a diffracted light with the aberration, and 17 denotes an ideal image point. Moreover, a difference between the wavefront 13 and ideal wavefront 14 is wavefront aberration.

When there is no aberration, all the diffracted lights 15 reach the ideal image point 17, and the pattern formed in the photomask is reproduced on a wafer by interference of the light. However, when there is the aberration, the diffracted light does not converge into the ideal image point 17 and, as a result, blur or deformation of the image occurs.

Figure 2:
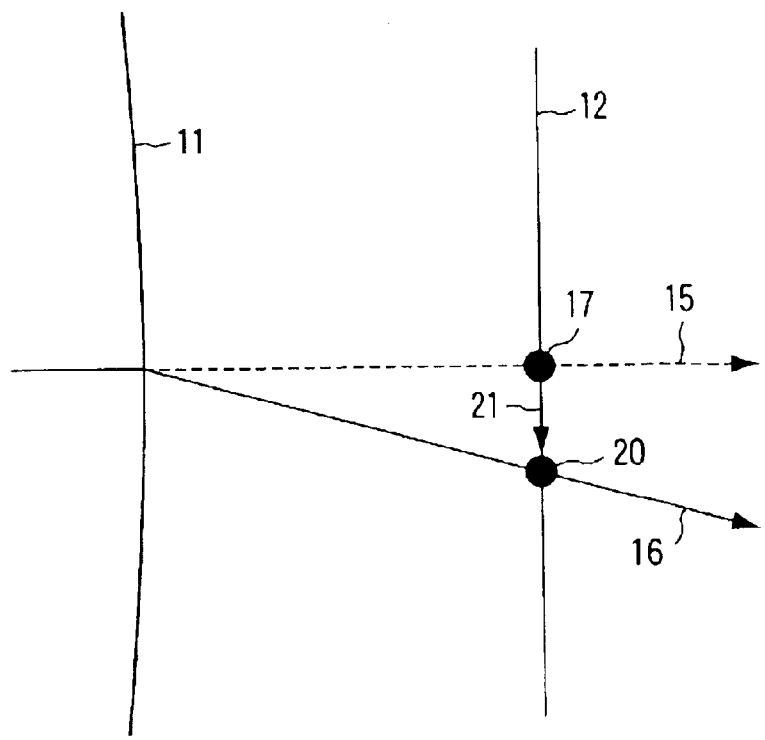
FIG. 2 is a diagram showing that one diffracted light reaches a point deviating from an ideal image point on the substrate disposed on an ideal imaging surface.

FIG. 2 shows that one diffracted light 16 in FIG. 1 is noted and that the light 16 reaches a point 20 deviating from the ideal image point 17 on the substrate disposed on an ideal imaging surface. A vector 21 directed to the point 20 from the ideal image point 17 is lay aberration (lateral aberration).

Figure 3:
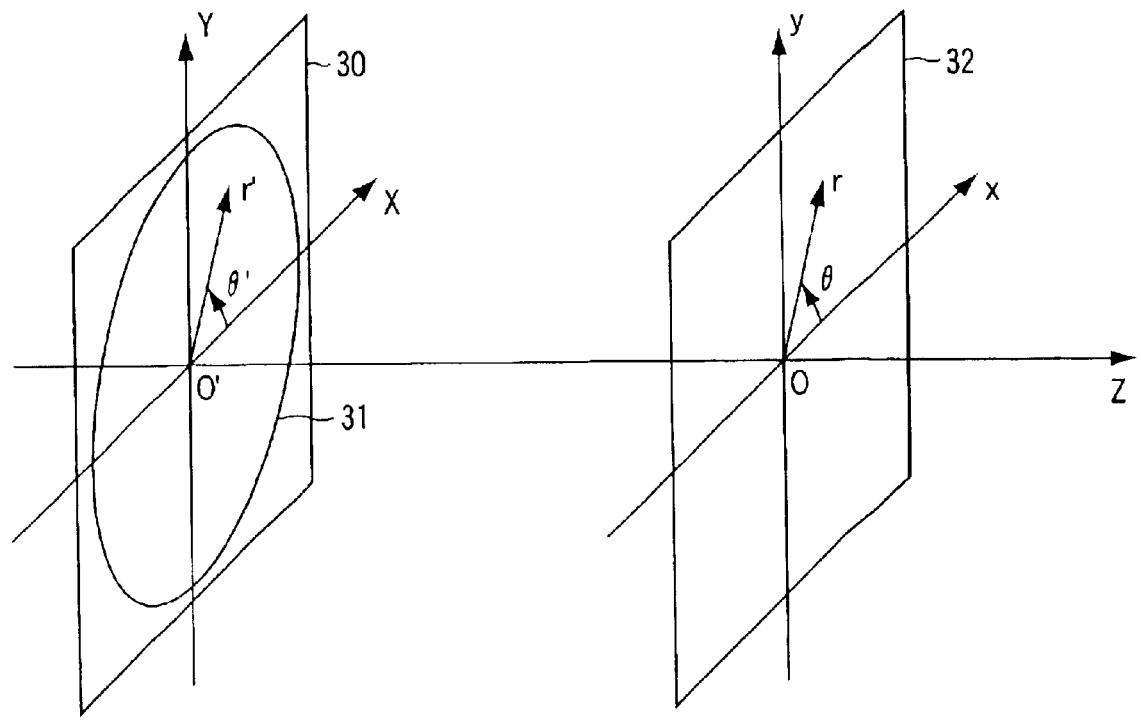
FIG. 3 is an explanatory view of a relation between a pupil coordinate system and image plane coordinate system.

Wavefront aberration measuring method described hereinafter comprises: measuring the lay aberration; and deriving the wavefront aberration from the result. A principle of the measuring method will be described hereinafter. The wavefront aberration of a lens can be represented as a function on a projection pupil plane. FIG. 3 is an explanatory view of a relation between a pupil coordinate system and image plane coordinate system. As shown in FIG. 3, it is assumed that an XY plane 30 is a projection pupil plane, and a region in a circle having a radius 1 on this plane is a projection pupil 31. The coordinate system representing a point on the projection pupil 31 is assumed to be a normalized coordinate system (hereinafter referred to simply as a pupil coordinate system) which has an origin in a center O' of the projection pupil 31 and in which the radius of the projection pupil 31 is 1. Moreover, the lay aberration is represented as a vector value on an ideal image plane (xy plane) 32. Furthermore, a traveling direction of the light is a positive Z direction.

Figure 4:
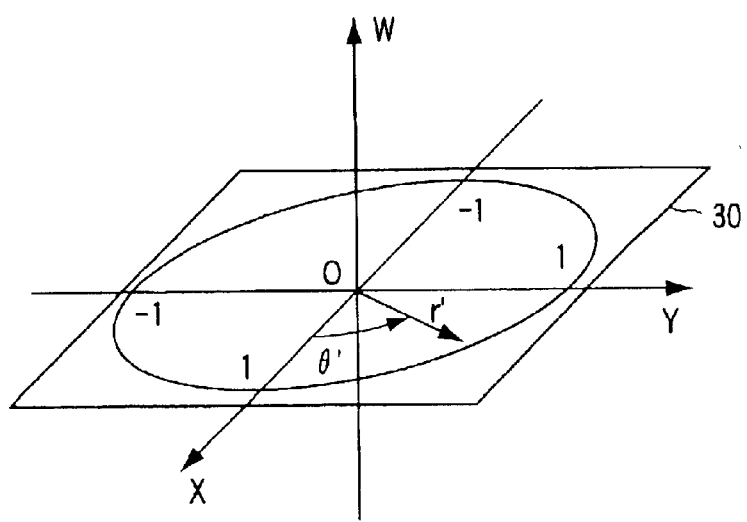
FIG. 4 is an explanatory view of the pupil coordinate system and a defined region of wavefront aberration.

FIG. 4 is an explanatory view of the pupil coordinate system and a defined region of wavefront aberration. FIG. 4 is shown in the pupil coordinate system, and wavefront aberration W is represented in the form of series as in the following equation in the pupil coordinate system.

$$w(r', \theta') = \sum_n C_n \cdot R_n(r')\Theta_n(\theta'), \quad (1)$$

wherein $0 \leq r' \leq 1$, $-180° \leq \theta' \leq 180°$.

W(r',θ') is wavefront aberration function, and represents an optical path difference between a wavefront having actual aberration and wavefront having no aberration in a point (r',θ') on the projection pupil (or (X, Y), wherein X=r' cos θ', Y=r' sin θ'). Moreover, in the equation (1), $R_n(r')\Theta_n(\theta')$ on a right side can be represented using an arbitrary orthogonal function system, but is generally represented using a Zernike polynomial expression. The type and magnitude of the aberration is represented by Zernike aberration coefficient, and in general 33 coefficients corresponding to aberrations of 3rd to 9th-orders and 11th-order wavefront aberrations are used.

As described in pages 12 to 14 of "Applied Optics and Optical Engineering Volume XI" (Shannon, Wyant; Academic Press, Inc), the spherical aberration can be obtained from the lay aberration. For example, in FIG. 2, when the lay aberration 21 of the light 16 passed on the projection pupil $(X_n, Y_n)$ is $(\epsilon_{xn}, \epsilon_{yn})$, a relation between the wavefront aberration $W(X_n, Y_n)$ and the lay aberration is represented by the following equation.

$$\frac{\partial W}{\partial X}(X_n, Y_n) = -NA \cdot \epsilon_{xn} \qquad (2-1)$$

$$\frac{\partial W}{\partial Y}(X_n, Y_n) = -NA \cdot \epsilon_{yn} \qquad (2-2)$$

That is, $$\nabla \cdot W(X_n, Y_n) = -NA(\epsilon_{xn} - \epsilon_{xn0}, \epsilon_{yn} - \epsilon_{yn0}) \qquad (2-3),$$

wherein NA denotes a numerical aperture on a projection side of the projection optical system.

The present method comprises: using this relation to calculate the wavefront aberration based on the measured lay aberration. When the equation (1) is used as a model equation of fitting to perform least-squares fitting, the wavefront aberration is obtained in the form of a continuous function defined in the whole projection pupil.

To obtain the lay aberration, in the present method, a structure of a secondary light source in the illuminating optical system is used which is a set of point sources. The light emitted from one point source in the secondary light source is noted, the light is divided into the diffracted lights using a diffraction grating on a photomask surface, and the path of the light is traced. Here, an incidence angle of the light from each point source with which the mask pattern is irradiated is assumed to be known.

Figure 5:
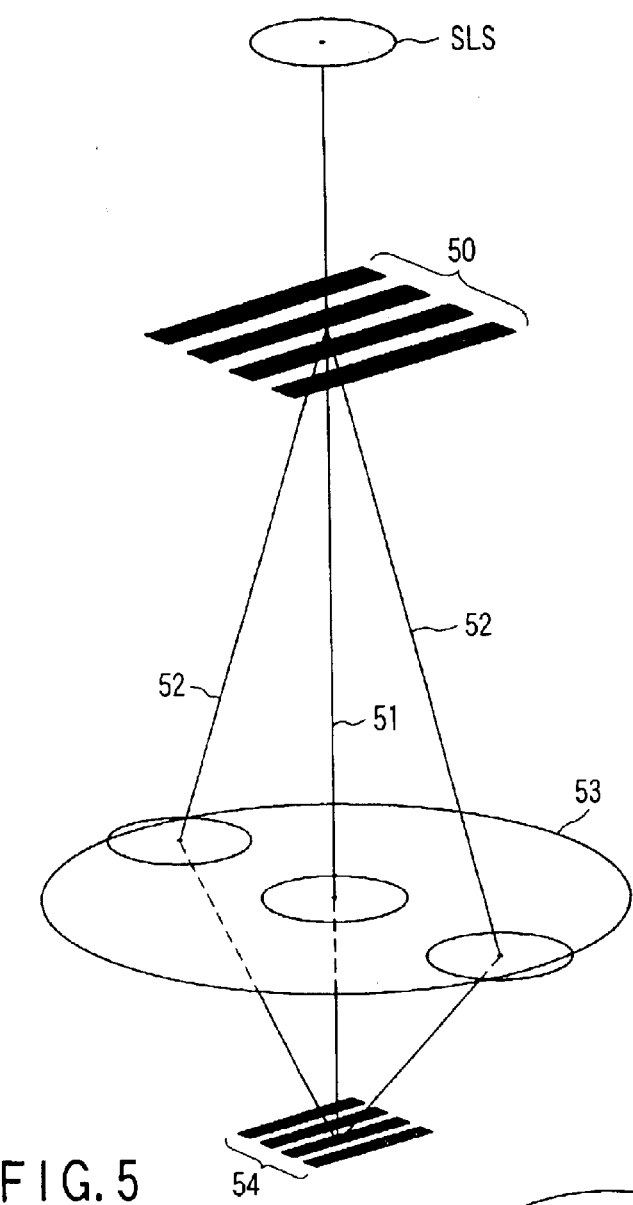
FIG. 5 is an explanatory view of diffraction and image formation at a time when a line and space pattern is exposed.
Figure 6:
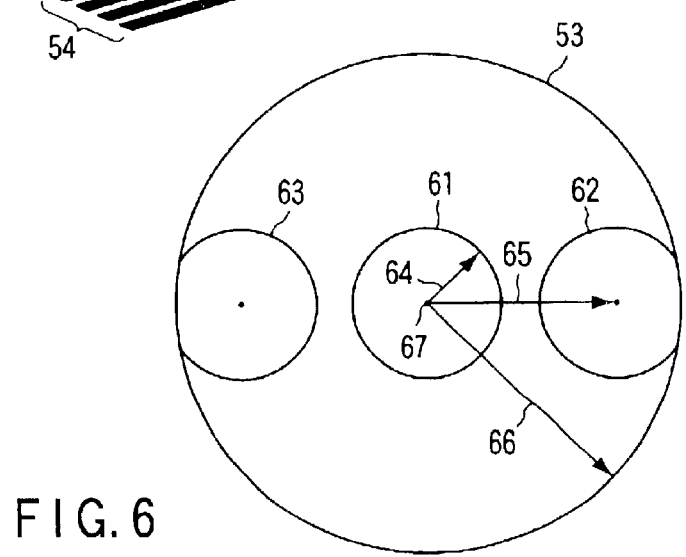
FIG. 6 is an explanatory view of a distribution of the diffracted light on the projection pupil.

First, a design of the diffraction grating will be described with reference to FIG. 5. FIG. 5 is an explanatory view of diffraction and image formation at a time when a line and space pattern is exposed. It is considered that a fine pattern drawn on the mask, such as a line and space pattern 50 having a pitch p on the photomask in a period, is projected onto the substrate. FIG. 5 shows that a 0th-order diffracted light 51 and ±1st-order diffracted lights 52 are passed through a projection pupil 53 of the projection optical system and an optical image 54 is formed on the substrate. In this case, a distribution of the diffracted light on the plane of the projection pupil 53 is represented by FIG. 6. FIG. 6 is an explanatory view of the distribution of the diffracted light on the projection pupil. A coordinate system of FIG. 6 is a pupil coordinate system, a 0th-order diffracted light 61 is distributed in the middle, ±1st-order diffracted lights 62 is distributed on the right side, and −1st-order diffracted light 63 is distributed on the left side. The center of the projection pupil 53 agrees with that of the 0th-order diffracted light 61. A distance 65 between the centers of the 0th-order diffracted light 61 and ±1st-order diffracted lights 62, 63 is represented by λ/(p·NA). Here, λ denotes an exposure wavelength. Moreover, a radius 64 of a circle showing each diffracted light is a coherence factor (σ value) of the projection optical system.

As shown in FIG. 5, the diffracted lights 51, 52, 53 passed through different points on the projection pupil 53 plane reach substantially the same position on the image plane. By mutual interference of the diffracted lights, the optical image 54 is formed on the substrate, which has a shape analogous with that of the line and space pattern 50 on the photomask.

Figure 7:
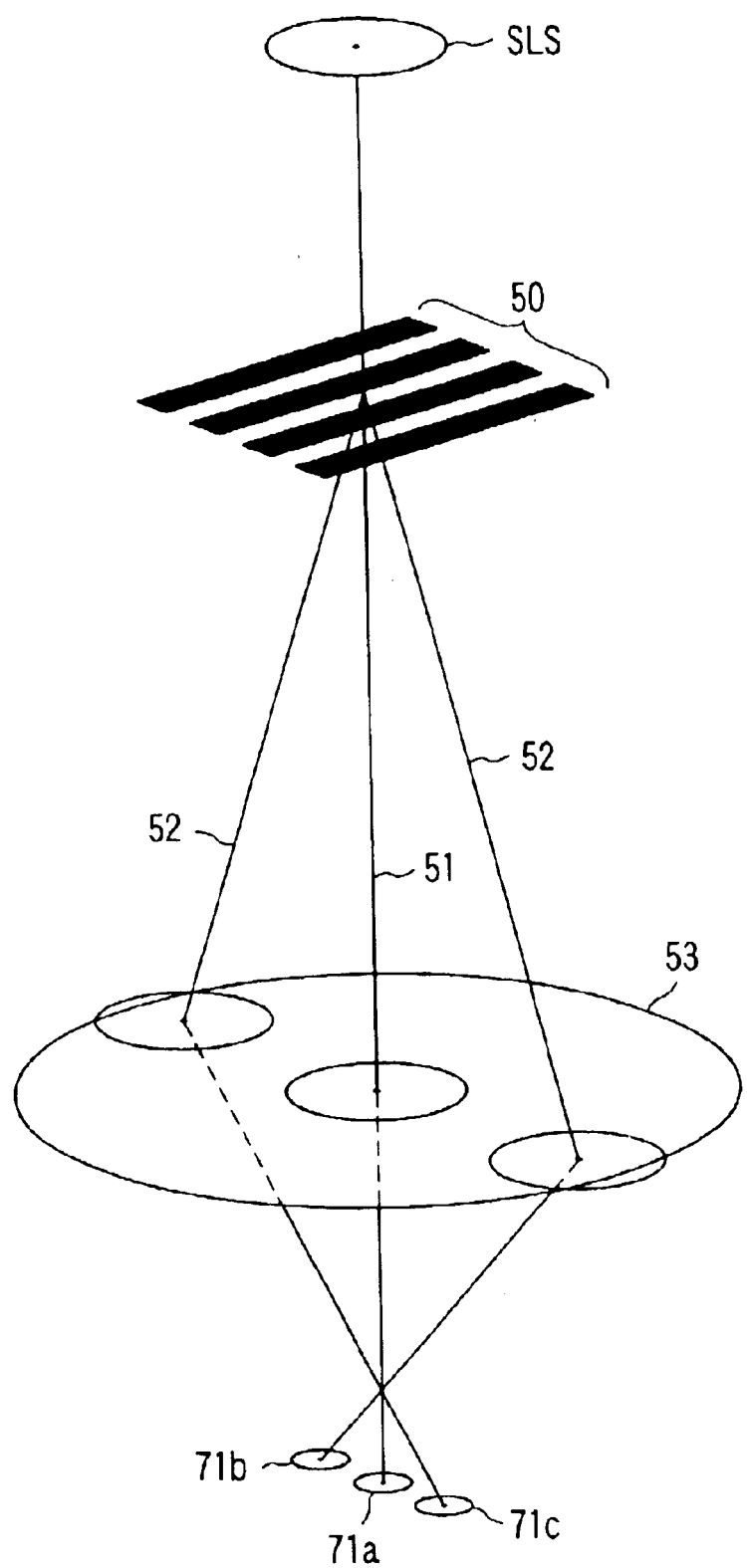
FIG. 7 is a diagram showing an image formed when the substrate is disposed in an excessively large defocus position.

Next, a method of tracing the light path of the diffracted light will be described with reference to FIG. 7. FIG. 7 shows an image formed when the substrate is disposed in an excessively large defocus position. As shown in FIG. 7, in a state in which a substrate surface is excessively largely defocused, access positions of the respective diffracted lights 51, 52 on the substrate differ, therefore the interference does not occur, and the respective diffracted lights are transferred into separate positions 71a, 71b, 71c. The defocused state is a state in which the substrate surface is conjugated with the secondary light source. As shown in FIG. 7, a pinhole camera may be used in separating and transferring the point source. When a pinhole pattern (hereinafter referred to as the grating pinhole pattern) described in Jpn. Pat. Appln. KOKAI Publication No. 2000-21732 (U.S. Pat. No. 6,317,198) and having appropriate dimensions and including the diffraction grating inside is used as a mask pattern, the diffracted lights are generated, and the access positions of the diffracted lights in the substrate surface can be known.

Figure 8A:
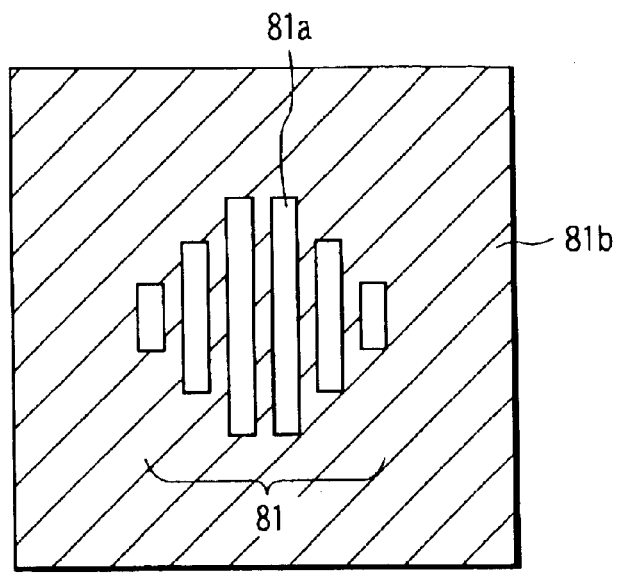
FIGS. 8A to 8C are plan views showing a grating pinhole which can separate and transfer a point source.
Figure 8B:
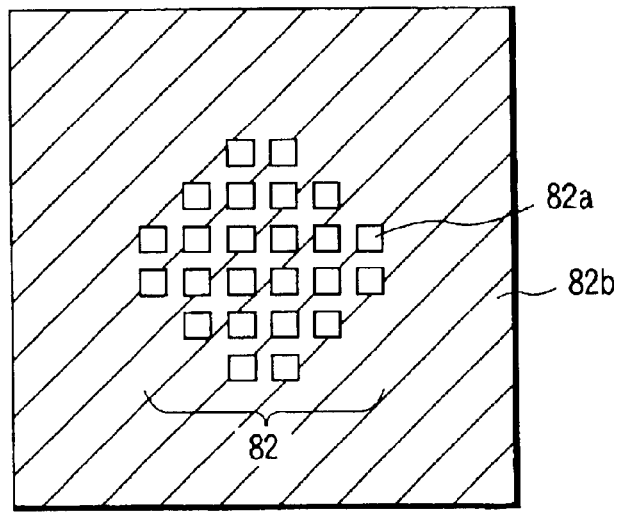
Figure 8C:
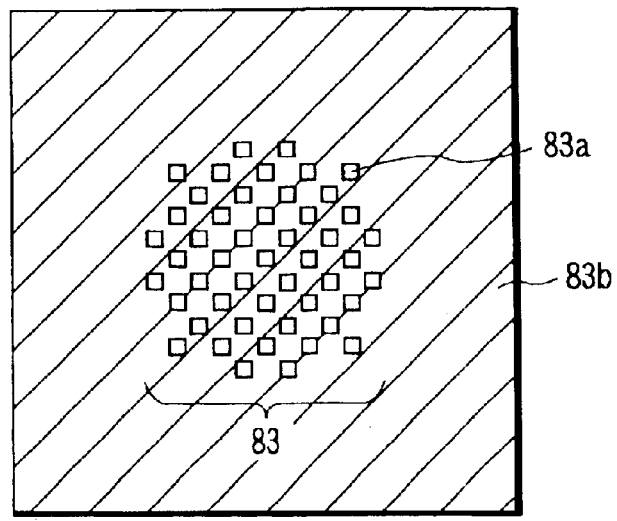

FIGS. 8A to 8C show plan views of the grating pinhole which can separate lights from the point sources and transfer. FIG. 8A shows a one-dimensional grating pinhole 81. FIG. 8B shows a two-dimensional grating (square grating) pinhole 82. FIG. 8C shows a two-dimensional grating (checkerboard pattern) pinhole 83. In FIGS. 8A to 8C, reference numerals 81a, 82a, 83a denote opening regions, and 81b, 82b, 83b denote opaque regions. A pattern which has periodicity in at least one direction, other than the pinholes shown in FIGS. 8A to 8C, can be used as an inner structure of the grating pinhole. For example, a pattern (actual pattern) having the periodicity for use in actually manufacturing a semiconductor device may also be used.

To obtain a clear transferred image to such a degree, every point source image can separately be measured, an outer shape of the grating pinhole has to have a size such that the pinhole functions as a pinhole camera indicating high resolution. It is known that when an appropriate relation is kept between the size of the pinhole and a distance to a screen for showing the image from the pinhole, there is a point having a maximum resolution. With the use of a circular pinhole, a radius r (scale on the photomask) with which the resolution becomes satisfactory is given by the following equation (3) assuming that a defocus amount of the substrate is d and exposure wavelength is λ.

$$r = \frac{A\sqrt{\lambda d}}{M}, \qquad (3)$$

wherein M is a reduction ratio (e.g., ¼) of the projection optical system, and A is a constant of about 1. We have confirmed by experiment that with the use of the grating pinhole having a radius represented by r in a state of A in a range of 0.5 to 1, a satisfactory image is obtained.

Figure 9A:
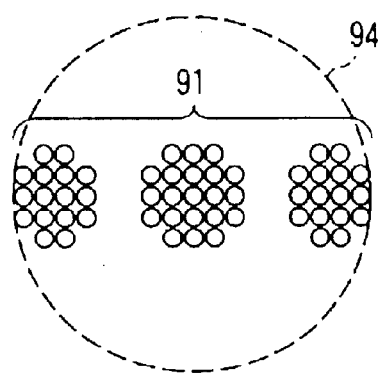
FIGS. 9A to 9C are plan views showing the image of a photoresist pattern obtained by exposure by the point source separated by the grating pinhole.
Figure 9B:
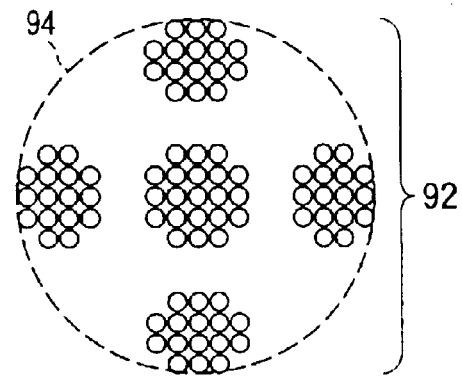
Figure 9C:
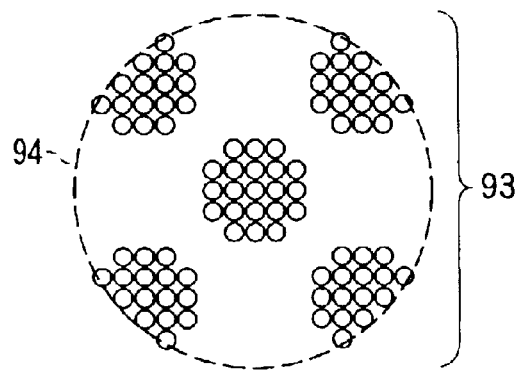

FIGS. 9A to 9C are plan views showing the image of a photoresist pattern obtained by exposure by the point source separated by the grating pinhole. FIG. 9A shows a diffracted light image 91 by the one-dimensional grating pinhole 81. FIG. 9B shows a diffracted light image 92 by the two-dimensional grating (square grating) pinhole 82. FIG. 9C shows a diffracted light image 93 by the two-dimensional grating (checkerboard pattern) pinhole 83. In FIGS. 9A to 9C, a circle 94 shown by a broken line shows a boundary in which the light is blocked by a diaphragm, and the outside of the boundary is not transferred onto the substrate.

As shown in FIGS. 9A to 9C, access points (diffracted light images) of the light emitted from each point source is transferred onto the substrate surface in a spot shape. When the position of each spot is measured, a pass position of the light emitted from each point source in the substrate surface can be grasped. The measurements are performed twice in the same apparatus state and with a changed defocus value of the substrate, and two points in a space through which the lights pass can then be known. That is, from a rectilinear propagation property of the light, a path of the light in the vicinity of the substrate surface can be known. Furthermore, it is possible to obtain the coordinate of a point in which a line connecting two points to each other in the obtained space intersects with the image plane.

Figure 10:
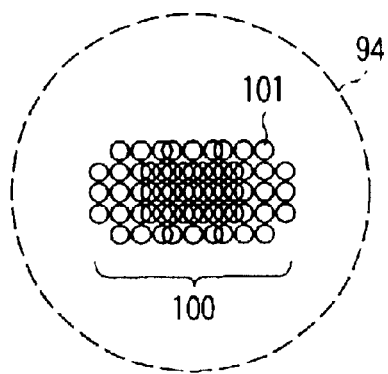
FIG. 10 is a diagram showing that diffracted light images overlap with each other.

As shown in FIG. 10, when diffracted light images 101 overlap with each other, it is difficult to measure the position of the point source image. Therefore, preferably the diffracted light images do not overlap with each other. Moreover, in the present method, since the image of the 1st-order diffracted light is used in measurement, the 1st-order diffracted light has to pass through the pupil and reach the substrate. When the above-described two conditions are satisfied, measurable conditions are obtained. When a period of the diffraction grating on the photomask is appropriate, two conditions can be satisfied.

The condition to be satisfied by a period p of the diffraction grating is represented by the following equation (4) using the exposure wavelength λ, numerical aperture NA of the exposure apparatus, and coherence factor σ.

$$\frac{\lambda}{NA(1+\sigma) \cdot M} < p < \frac{\lambda}{2NA \cdot \sigma \cdot M} \quad (4)$$

It is to be noted that even if the images of the diffracted lights overlap with each other to some degree, but when there are point source images not overlapped, it is possible to measure the region using the images. The diffracted light may be passed through a plurality of points in the projection pupil in order to obtain the optical path difference concerning the whole projection pupil. For this purpose, the period of the diffraction grating is changed in a range which satisfies the equation (4). Moreover, a plurality of grating pinholes in which an arrangement direction of a period pattern has been changed are simultaneously used.

A method of obtaining a difference between optical path differences of the 0th-order diffracted light and 1st-order diffracted light will be described with reference to FIGS. 11A to 11C. FIG. 11B is an enlarged view of a circle B part of FIG. 11A, and FIG. 11C is an enlarged view of FIG. 11B. In FIG. 11A, reference numeral 223 denotes an ideal image plane. As shown in FIGS. 11A to 11C, an access position 217 of a 1st-order diffracted light 215 is measured using an access position 218 of a 0th-order diffracted light 214 as a reference. Therefore, a difference 210 between an optical path difference 212 of the 0th-order diffracted light and a optical path difference 213 of the 1st-order diffracted light is obtained. Here, as shown in FIGS. 11B, 11C, the optical path differences 212, 213 are differences between a wavefront 219 having no aberration and a wavefront 220 having the aberration. The optical path difference (wavefront aberration) 213 itself shown in FIG. 11C is to be obtained. To obtain the true optical path difference 213, the optical path difference 212 of the 0th-order diffracted light itself for use in the measurement has to be known as shown in FIG. 11B. For example, a light 222 passed through the middle of the projection pupil to reach an ideal image point 216 can be used as the reference, that is, an optical path difference of 0 to obtain the optical path difference of another position. It is to be noted that even if a reference position is changed, for an influence, only a first term (constant term) of a Zernike polynomial expression changes. Considering that fifth and subsequent terms are significant as the aberration, there is no problem in calculation of the wavefront aberration.

To exactly obtain a lens wavefront aberration, it is also necessary to measure the aberration of the light passed through a position in the vicinity of the middle of the projection pupil. As described above, this is possible, when σ is reduced and the period of the diffraction grating is enlarged. When the light from one arbitrary point source in the secondary light source is used to form and measure the resist pattern, the optical path difference in a position in the vicinity of the middle of the projection pupil can be measured. The point source for use does not have to be necessarily in the middle, and the arbitrary point source in the secondary light source may also be lit alone and used in measuring the aberration. The overlap of the diffracted lights can conveniently be minimized.

When the diffraction grating constituting the grating pinhole is used as a device pattern, the optical path difference is directly measured concerning the projection pupil position actually passed by the light during the transfer of the device pattern. In this case, there is an advantage that it is possible to directly measure the aberration only of the path through which the light passes in the device pattern transfer.

Embodiments of the present invention will be described hereinafter with reference to the drawings.

(First Embodiment)

In a first embodiment, aberration measuring method of the projection optical system of an actual exposure apparatus will be described.

The gist of the present method lies in a method comprising: guiding an illuminating light from a secondary light source into a photomask; collectively irradiating a finite region and allowing a 0th-order diffracted light and high-order diffracted light generated by a diffraction pattern disposed in the surface of the photomask to be incident upon a projection optical system; projecting/exposing the respective diffracted lights projected from the projection optical system into distant positions on a photosensitive substrate; measuring positions of images of the 0th-order diffracted light (hereinafter referred to as the 0th-order image) and 1st-order diffracted light (hereinafter referred to as the 1st-order image) formed on the photosensitive substrate; using the result to calculate lay aberration (lateral aberration) of the projection optical system of the exposure apparatus; and calculating wavefront aberration of the optical system based on the lay aberration. Based on the wavefront aberration obtained in this manner, the shape of a semiconductor device pattern formed using the exposure apparatus can exactly be predicted, and a pattern which is not easily influenced by the wavefront aberration can be designed.

FIG. 12 is a diagram showing a schematic constitution of the exposure apparatus in which the pattern drawn in the photomask is reduced/projected on the substrate according to the first embodiment. As shown in FIG. 12, the illuminating light from a laser source LS is incident upon an illuminating optical system IL. The illuminating optical system IL includes a fly's eye lens FE, illuminating aperture IA, and condenser lens CL. In the illuminating optical system IL, the illuminating light is incident upon the fly's eye lens FE constituted of a plurality of lens devices. On the projection side of the fly's eye lens FE constituted of the plurality of lens devices, a secondary light source SLS is formed in which the illuminating light is a set of a plurality of point sources. The size of the secondary light source SLS is adjusted by the illuminating aperture IA. The illuminating light emitted from the secondary light source SLS is incident upon a photomask R via the condenser lens CL. The diffracted light is generated in a pattern RP on the photomask R. The diffracted light is incident upon a projection optical system PL. The diffracted light projected from the projection optical system PL reaches a substrate W, and thereby the image of the pattern RP is formed/projected onto the substrate W.

Figure 13:
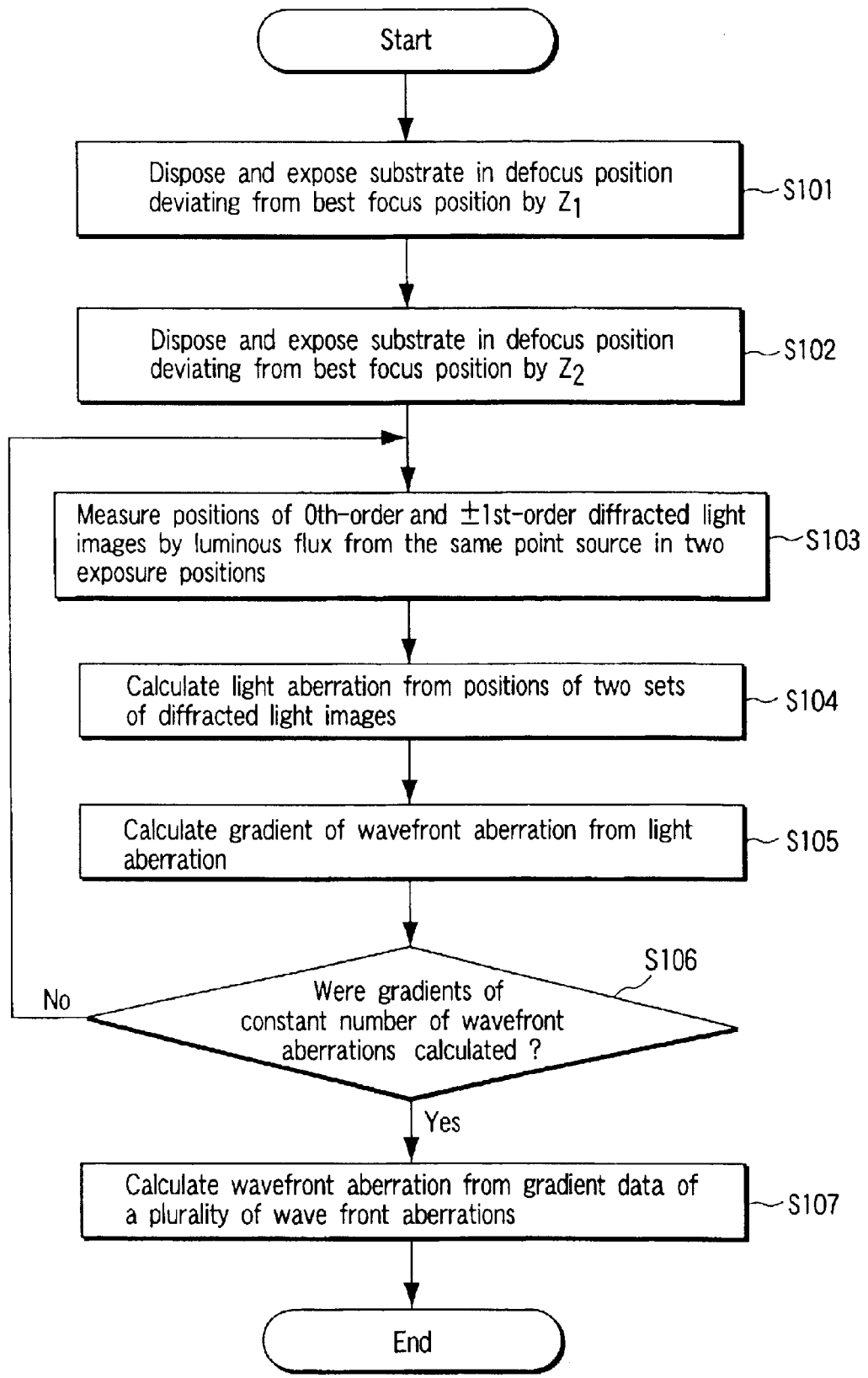
FIG. 13 is a flowchart showing aberration measuring method of the projection optical system according to the first embodiment.

Aberration measuring method of the projection optical system will be described hereinafter in six divided steps. FIG. 13 is a flowchart showing the aberration measuring method of the projection optical system according to the first embodiment of the present invention.

(Step S101)

Figure 14A:
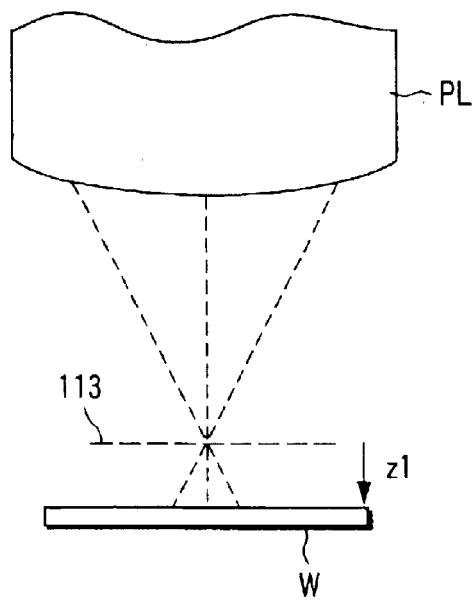
FIGS. 14A, 14B are diagrams showing a disposed position of the substrate in the aberration measuring method according to the first embodiment.

As shown in FIG. 14A, a substrate W whose surface is coated with photosensitive agents such as a photoresist is disposed in a position moved from a best focus position 113 by a defocus amount z1 and exposed.

(Step S102)

Figure 14B:
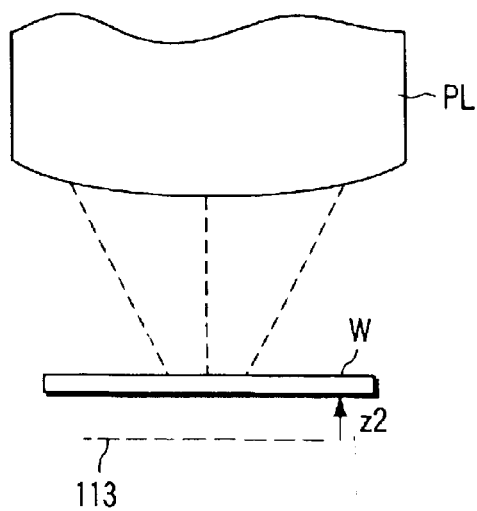

As shown in FIG. 14B, the same substrate is disposed in a position moved from the best focus position 113 by a defocus amount $z_2$ ($\neq z_1$), further moved in a lateral position, disposed in a position such that an unexposed portion forms an exposed region, and exposed.

(Step S103)

The resist exposed in the steps S101, S102 is developed into the image, and the resist pattern formed on the substrate W is measured. A set of a 0th-order image and 1st-order image emitted from the same point source (assumed to be an n-th set) is noted, and a 0th-order image position is used as a coordinate origin to obtain the position of the 1st-order image. Here, it is assumed that a three-dimensional coordinate of the position of the 1st-order image exposed in the step S101 is ($x_{1n}$, $y_{1n}$, $z_{1n}$), and the three-dimensional coordinate of the position of the image exposed in the step S102 is ($x_{2n}$, $y_{2n}$, $z_{2n}$).

(Step S104)

A deviation from an ideal image point of an intersection of the light and image plane, that is, lay aberration ($\epsilon_{xn}$, $\epsilon_{yn}$) is obtained from the following equations (5a), (5b).

$$\varepsilon_{xn} = \frac{z_{1n}x_{2n} + z_{2n}x_{1n}}{z_{1n} + z_{2n}} \quad (5a)$$

$$\varepsilon_{yn} = \frac{z_{1n}y_{2n} + z_{2n}y_{1n}}{z_{1n} + z_{2n}} \quad (5b)$$

(Step S105)

A gradient of the wavefront aberration in the point ($X_n$, $Y_n$) is obtained from the lay aberration ($\epsilon_{xn}$, $\epsilon_{yn}$). It is assumed that the optical path difference is represented by $W(X_n, Y_n)$, and the lay aberration of the 0th-order diffracted light is ($\epsilon_{xn0}$, $\epsilon_{yn0}$). Then, a gradient $\nabla W(X_n, Y_n)$ of the wavefront aberration is obtained by the following equation (6).

$$\nabla \cdot W(X_n, Y_n) = -NA(\epsilon_{xn} - \epsilon_{xn0}, \epsilon_{yn} - \epsilon_{yn0}) \quad (6)$$

wherein ($X_n$, $Y_n$) is a pass point of the diffracted light in the normalized pupil coordinate system determined from the period of the diffraction grating, order number and symbol of the diffracted light, and position of the corresponding point source.

It is assumed that the lay aberration of the 0th-order diffracted light is 0 in the very vicinity of the center of the pupil. If 0th-order diffracted light didn't passed through the center of the pupil, another appropriate pattern is used, and a result measured in the method described herein is used.

(Step S106)

Another image in the vicinity on the resist pattern is used, the procedure of the steps S103 to S105 is repeated, and a constant number or more of gradients $\nabla \cdot W(X_n, Y_n)$ of wavefront aberrations are calculated. The wavefront aberration gradients $\nabla W(X_n, Y_n)$ in a plurality of points on the projection pupil are calculated. Here, the constant number is a number sufficient for obtaining the wavefront aberration W(X, Y) in the subsequent process.

(Step S107)

The wavefront aberration W(X, Y) in the whole projection pupil is calculated from gradient data $\nabla \cdot W(X_n, Y_n)$ (n=1 to the number of all point sources) of all the wavefront aberrations, this result is subjected to least-squares fitting with Zernike series, and each Zernike aberration coefficient is obtained.

(Second Embodiment)

In a second embodiment, exposure is performed in two defocus positions plane-symmetric with respect to the best focus position. Since the used exposure apparatus is the same as that shown in FIG. 12, drawing and description are omitted. It is to be noted that in the present embodiment, the exposure apparatus is used having a wavelength $\lambda[\mu m]$ of the illuminating light from the laser source LS and a reduction ratio M of the projection optical system PL.

The mask pattern of the grating pinhole was used in which the period of the diffraction grating formed in the photomask was a line and space of $p/M[\mu m]$ and radius is $r[\mu m]$. Here, p was determined so as to satisfy the condition of equation (7).

$$\frac{\lambda}{NA(1+\sigma) \cdot M} < p < \frac{\lambda}{2NA \cdot \sigma \cdot M}, \quad (7)$$

wherein NA denotes a numerical aperture on the projection side of the projection optical system PL and $\sigma$ is a coherence factor of the illuminating optical system IL.

Figure 15:
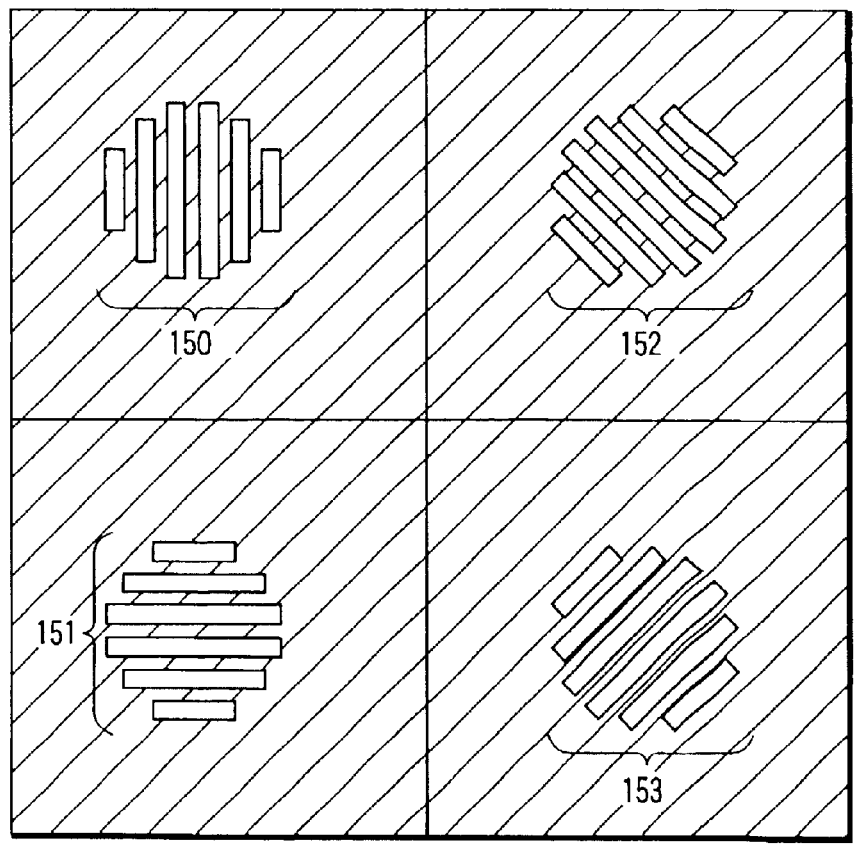
FIG. 15 is a plan view showing the photomask for use in the aberration measuring method according to a second embodiment.

The photomask R is used in which a set of pattern groups including a vertical pattern 150, lateral pattern 151, oblique pattern 152, and oblique pattern 153 is disposed in the vicinity as shown in FIG. 15. FIG. 15 is a plan view showing the photomask for use in the aberration measuring method according to the second embodiment of the present invention. For the photosensitive substrate, a silicon wafer (hereinafter referred to as the wafer) coated with a positive photoresist (photosensitive agent) was used.

Figure 16A:
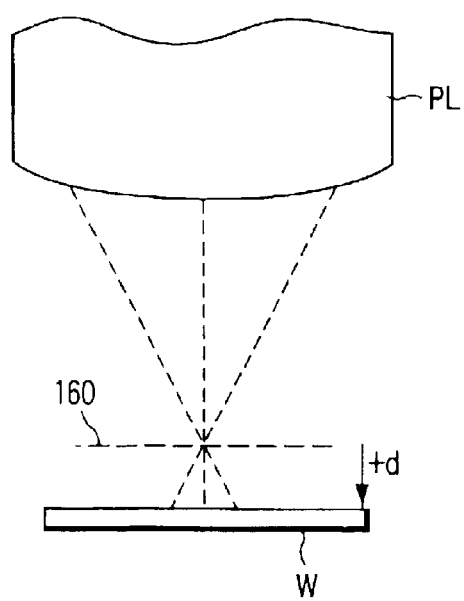
FIGS. 16A, 16B are diagrams showing the disposed position of the substrate in the aberration measuring method according to the second embodiment.

First, as shown in FIG. 16A, the substrate W is disposed in a position moved from a best focus position 160 by the defocus amount −d (=$z_1$) [$\mu$m], and stationary exposure is performed in an appropriate exposure amount.

Figure 16B:
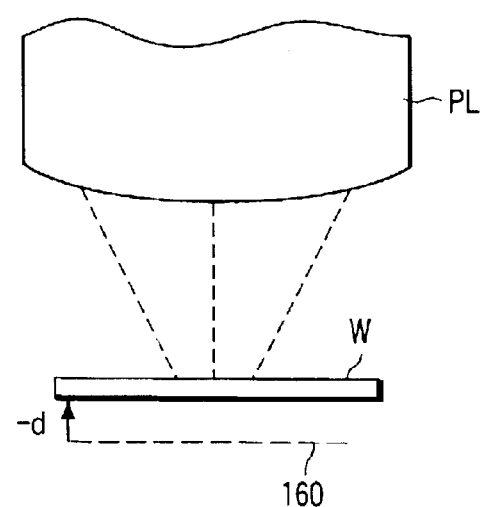

Subsequently, as shown in FIG. 16B, the same substrate W is disposed in a position moved from the best focus position 160 by the defocus amount +d (=$z_2$) [$\mu$m], further moved in a lateral direction, and disposed in a position in which the unexposed portion forms the exposure region, and the stationary exposure is performed. It is to be noted that for the exposure condition of the defocus amount +d, the exposure conditions other than the defocus amount are set to be similar to those at an exposure time of the defocus amount −d, and the exposure is performed.

Figure 17A:
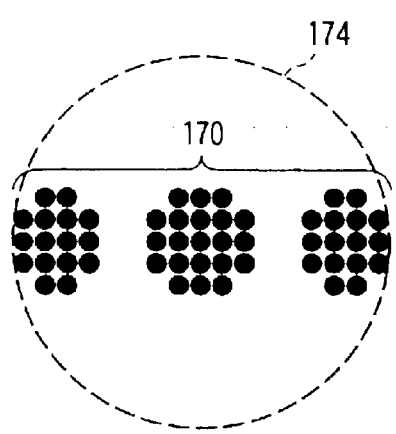
FIGS. 17A to 17D are plan views showing the resist pattern for evaluation.
Figure 17C:
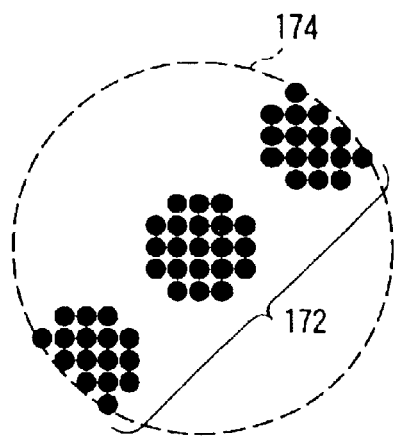
Figure 17B:
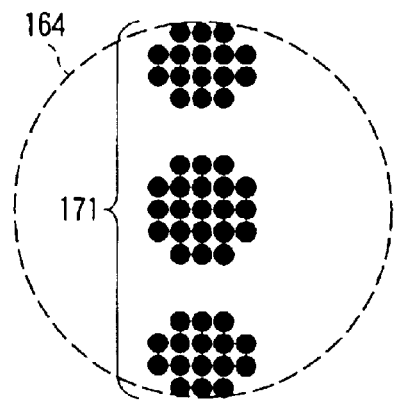
Figure 17D:
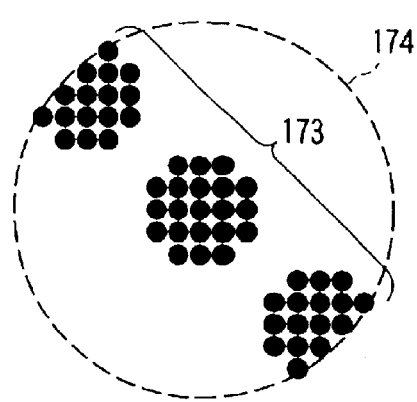

Thereafter, the image is developed, and thereby a pattern for evaluation (hereinafter referred to as the pattern 1) which has been exposed in the defocus position +d[$\mu$m] and a photoresist pattern for evaluation (hereinafter referred to as the pattern 2) exposed in the defocus position −d[$\mu$m] are obtained. Plan views of the obtained resist patterns for evaluation are shown in FIGS. 17A to 17D. FIG. 17A shows a photoresist pattern for evaluation 170 formed by the image of the vertical pattern 150. FIG. 17B shows a photoresist pattern for evaluation 171 formed by the image of the lateral pattern 151. FIG. 17C shows a photoresist pattern for evaluation 172 formed by the image of the oblique pattern 152. FIG. 17D shows a photoresist pattern for evaluation 173 formed by the image of the oblique pattern 153. An image pickup apparatus composed of an optical microscope and CCD camera is used to observe these resist patterns for evaluation 170 to 173, and the image is acquired. In FIGS. 17A to 17D, a circle 174 shown by a broken line represents the boundary in which the light is blocked by the diaphragm, and the outside of the boundary is not transferred onto the substrate.

Figure 18:
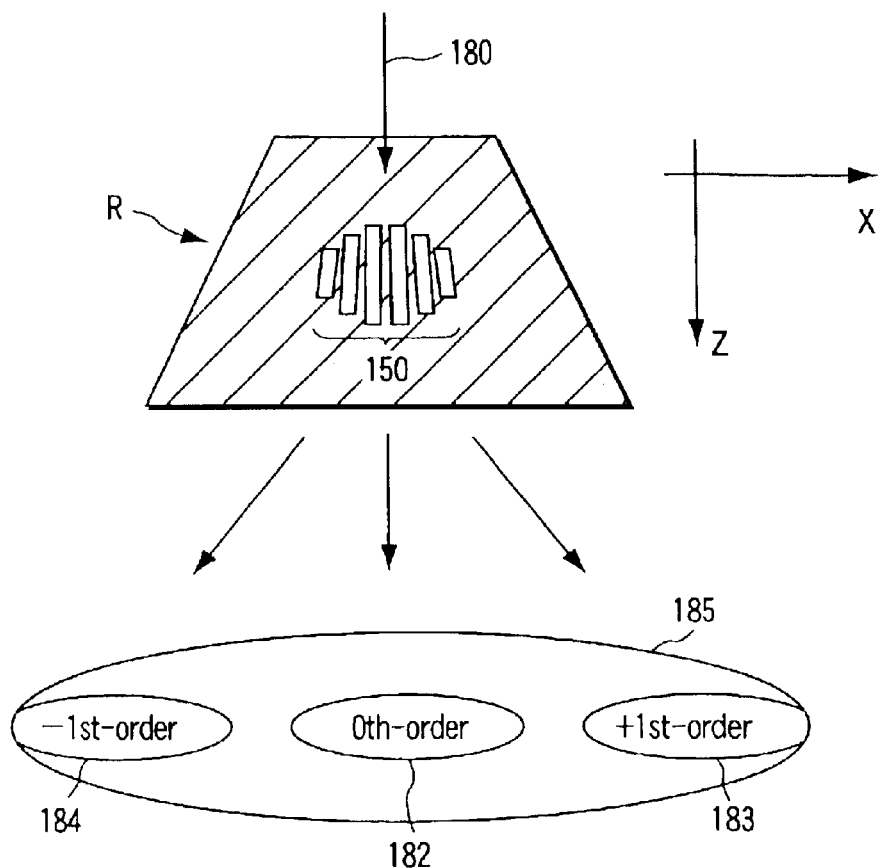
FIG. 18 is a diagram showing a correspondence between the pattern on the photomask and an order number and position of the diffracted light on the projection pupil.
Figure 19A:
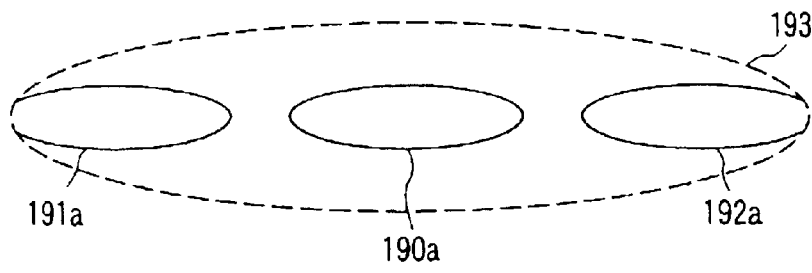
FIGS. 19A, 19B are diagrams showing a correspondence between the order number and position of the diffracted light on the projection pupil and the image on the substrate.
Figure 19B:
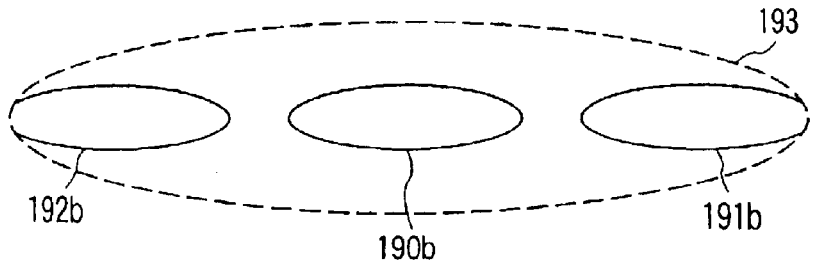

A method of calculating the magnitude of the aberration from the resist pattern for evaluation 170 formed by the image of the vertical pattern 150 will be described hereinafter. A correspondence between the pattern on the photomask and an order number and position of the diffracted light on the projection pupil is shown in FIG. 18. As shown in FIG. 18, the photomask R in which the vertical pattern 150 is formed is irradiated with an illuminating light 180, and thereby a 0th-order diffracted light image 182 in the middle on a projection pupil 185, +1st-order diffracted light image 183 on the right side of a drawing sheet, and −1st-order diffracted light image 184 on the left side of the drawing sheet are projected. Moreover, a correspondence between the order number and position of the diffracted light on the projection pupil and the image on the substrate is shown in FIGS. 19A, 19B. FIG. 19A shows a diffracted light image of each order number on the substrate in a case in which the image is exposed in the defocus position +d, and FIG. 19B shows a diffracted light image of each order number on the substrate in a case in which the image is exposed in the defocus position −d. As shown in FIGS. 19A, 19B, on the substrate, 0th-order diffracted light images 190 (190*a*, *b*), +1st-order diffracted light images 191 (191*a*, *b*), and −1st-order diffracted light images 192 (192*a*, *b*) are projected. Three diffracted light images forming the patterns on the substrate and projection pupil are calculated of further micro patterns (point source images). The micro pattern reflects a luminance distribution formed by the fly's eye lens of the secondary light source. In FIGS. 19A, 19B, a circle 193 shown by a broken line represents the boundary in which the light is blocked by the diaphragm, and the outside of the boundary is not transferred onto the substrate.

A pattern shown in FIG. 20 is measured. FIG. 20 is a diagram showing the pattern formed on the photosensitive substrate disposed in the defocus position +d by the diffracted light image of the vertical pattern 150. With the coherence factor σ of 0.3, as shown by the resist pattern for evaluation 170 in FIG. 17A, the number of point source images which can be used in the measurement is 53 excluding the images partially shielded by illuminating apertures. For combinations of the point source images formed by the diffracted light emitted from the same point source, there are 16 pairs of 0th-order and +1st-order diffracted lights, and 16 pairs of 0th-order and −1st-order diffracted lights, that is, 32 pairs in total. First, a pair of point source images 200*a*, 201*a* formed by the diffracted light emitted from the same point source are noted, and a position $(x_1, y_1)$ of the point source image 201*a* is measured using the position of the point source image 200*a* as the reference. In FIG. 20, a circle 202 shown by a broken line represents the boundary in which the light is blocked by the diaphragm, and the outside of the boundary is not transferred onto the substrate.

Next, a pattern shown in FIG. 21 is measured. FIG. 21 is a diagram showing the pattern formed on the photosensitive substrate disposed in the defocus position −d by the diffracted light image of the vertical pattern 150. A point source image 200*b* formed by the same light (the light emitted from the same point source and having the same diffraction order number) as the light which has formed the point source image 200*a* in FIG. 20, and a point source image 201*b* formed by the same light as the light which has formed the point source image 201*a* are noted. A position $(x_2, y_2)$ of the image 200 is measured using the position of the image 201 as the reference. Assuming that the point on the projection pupil for passing the lights 211 forming the point source images 201*a* and 201*b* is $(X_0, Y_0)$, a point P on the projection pupil through which the lights forming the point source images 200*a* and 200*b* are passed is represented by $(X_0+\lambda/(p \cdot NA), Y_0)$ in consideration of the direction of the diffraction grating, period p, and exposure wavelength λ. It is to be noted that the value of $(X_0, Y_0)$ is determined from the position of the noted point source in the secondary light source. In FIG. 21, a circle 203 shown by a broken line represents the boundary in which the light is blocked by the diaphragm, and the outside of the boundary is not transferred onto the substrate.

Considering the above-described measurement result, the lay aberration $(\epsilon_x, \epsilon_y)$ indicated by the light is as follows.

$$\left. \begin{array}{l} \varepsilon_x = \dfrac{-dx_1 + dx_2}{2d} \\ \varepsilon_y = \dfrac{-dy_1 + dy_2}{2d} \end{array} \right\} \qquad (8)$$

Therefore, a gradient $\nabla \cdot W = (\partial W_x/\partial x, \partial W_y/\partial y)$ of the wavefront aberration in the noted point $(X_0+\lambda/(p \cdot NA), Y_0)$ on the projection pupil is represented by the following equation. Here, the lay aberration in $(X_0, Y_0)$ is 0.

$$\dfrac{\partial W_x}{\partial x} = -NA \cdot \dfrac{-dx_1 + dx_2}{2d} \qquad (9a)$$

$$\dfrac{\partial W_y}{\partial y} = -NA \cdot \dfrac{-dy_1 + dy_2}{2d} \qquad (9b)$$

A similar method is applied with respect to the remaining 31 point source image pairs, and the gradients of the wavefront aberrations concerning 31 points on the projection pupil are obtained. Moreover, also with respect to the images of the other three patterns 151, 152, 153, the equations (8), (9a), (9b) are modified and calculated, and the gradients of the wavefront aberrations in the respective measurement points are obtained.

Discrete data indicating the gradient of the wavefront aberration over the whole projection pupil obtained in the above-described method is subjected to integration/calculation and fitting, thereby the wavefront aberration W(x, y) over the whole projection pupil is represented in the form of Zernike polynomial expression, and 33 Zernike aberration coefficients are obtained.

In the above-described example, the lay aberration of the 0th-order diffracted light passed through the path in the vicinity of the middle of the projection pupil is used as a reference (0) to perform calculation. However, when the lay aberration concerning the path is obtained beforehand, and the obtained value of the lay aberration is used in the above-described analysis, a more accurate result is obtained, which is preferable.

Next, the measurement of the lay aberration in the vicinity of the middle of the projection pupil will be described. FIG. 22 shows an example of the photomask for use in measuring the lay aberration in the vicinity of the pupil middle. As shown in FIG. 22, a photomask 210 is a grating pinhole having a radius of 10 μm (scale on the photomask) while the inner diffraction grating is a line and space having a period of 8 μm on the photomask. In FIG. 22, reference numeral 211 denotes an opening, and 212 is an opaque region. The exposure apparatus is used in which a KrF excimer laser beam having an exposure wavelength of 0.248 μm is used as the light source, the reduction ratio M of the projection optical system is ¼, and the numerical aperture on the projection side is 0.6. Moreover, the coherence factor σ of the illuminating optical system is set to 0.1, that is, a state is set in which only the light emitted from the single point source is used in exposure. The photomask is used in which one set of pattern group including the vertical, lateral, oblique (45°), and oblique (−45°) patterns (FIG. 22 shows only the vertical pattern) is disposed in the vicinity of the patterns 150, 151, 152, 153 shown in FIG. 15 in the exposure region. The photosensitive substrate is disposed in the position having a defocus amount of +30 μm, −30 μm to perform the exposure.

By a similar procedure, as shown in FIG. 23, patterns for evaluation 231, 232 having a defocus amount of +30 μm, and a pattern for evaluation having a defocus amount of −30 μm (not shown) were obtained. A 0th-order diffracted light image 231 and 1st-order diffracted lights 232 were used to calculate the lay aberration concerning the vicinity of the center of the pupil of the projection optical system by a procedure similar to the above-described method. It is to be noted that the position of an end 233 of the pupil does not appear in the acquired resist pattern. Therefore, it is necessary to measure the radius (actual scale on the wafer) of the pupil 233 beforehand by the exposure of another grating pinhole. Next, the calculation represented by the equations (8), (9a), (9b) was performed to calculate the gradient of the wavefront aberration concerning each optical path.

In this measurement, the lay aberration of the 0th-order diffracted light 231 passed through the center of the pupil is used as the reference (0) to obtain the lay aberration of the path through which the lights 232 are passed. It is also possible to obtain the lay aberration concerning another optical path using the lights 232 as the reference. When this method is repeatedly used, the gradients of the lay aberration and wavefront aberration concerning the optical path passed through the arbitrary position of the pupil are obtained using the light passed through the center of the pupil as a reference.

It is to be noted that, in the second embodiment, instead of the vertical, lateral, and ±45° oblique lines and spaces shown in FIG. 1, the square grating pinhole 82 or checkerboard grating pinhole 83 shown in FIG. 18 can also be used as the diffraction grating inside the grating pinhole to perform the measurement. Here, the diffracted light image 92 on the wafer with the use of the square grating 82 is a combination of the shapes of the images of the vertical and lateral lines and spaces. Moreover, the diffracted light image 93 on the wafer with the use of the square grating 83 is a combination of the shapes of the images of the lines and spaces oblique at 45° and 135°.

In the second embodiment, even when the photo-sensitive substrate is used instead of using the wafer coated with the positive photoresist or the silicon wafer coated with the photoresist, light intensity detection apparatuses such as CCD are used, and apparatuses for recording the position (distribution) of the detected light intensity, such as a computer, are used, similar measurement is possible.

In the second embodiment, even when a period pattern for use as a semiconductor device pattern is used as the diffraction grating instead of the line and space, the aberration of the lens can be measured. Usually, in a semiconductor device manufacturing process, illuminating having a large σ value (e.g., σ=0.75) is used, but the σ value which is reduced to be as small as possible is preferable for the present measurement, because the overlap of the images on the substrate is reduced. For example, only one arbitrary point source in the light source is lit, and the exposure is performed in this state to obtain the image.

The present invention is not limited to the above-described embodiments. It is possible to determine the shape and arrangement of the grating pinhole within a range not departing from the scope of the present invention. Furthermore, other embodiments and various modifications are possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aberration measuring method of a projection optical system, comprising:

preparing an exposure apparatus comprising a light source, an illuminating optical system which divides a light from the light source into a plurality of point sources to form a secondary light source and which guides an illuminating light from the secondary light source into a finite region of a photomask, and a projection optical system which transfers a reduced projected image of a transmitted light generated through a pattern disposed in the photomask onto a wafer;

collectively irradiating the finite region of the photomask in which a diffraction grating is formed with the illuminating light;

projecting a 0th-order diffracted light and 1st-order diffracted light passed through the photomask onto a first measurement plane conjugated with the secondary light source by using the projection optical system;

measuring a relation of projected positions in the first measurement plane between the 0th-order diffracted light and 1st-order diffracted light of the light emitted from one arbitrary point source in the secondary light source;

projecting the 0th-order diffracted light and 1st-order diffracted light onto a second measurement plane which is conjugated with the secondary light source and in which the position of the light of an optical axis direction is different by using the projection optical system;

measuring the relation of the projected positions of the second measurement plane between the 0th-order diffracted light and 1st-order diffracted light of the light emitted from the point source; and obtaining lay aberration concerning the light emitted from the point source on the basis of the obtained two relations of projected positions.

2. The aberration measuring method of the projection optical system according to claim 1, wherein the diffraction grating includes a periodic pattern in which a transmitted portion and shielded portion are repeated with a period p in:

$$\frac{\lambda}{NA(1+\sigma)\cdot M} < p < \frac{\lambda}{2NA\cdot\sigma\cdot M},$$

assuming that a magnification of the photomask is M, an exposure wavelength is λ, a numerical aperture on a projection side of the projection optical system is NA, and a coherence factor of the illuminating optical system is σ.

3. The aberration measuring method of the projection optical system according to claim 1, wherein the diffraction grating is a line and space pattern, square grating, or checkerboard grating.

4. The aberration measuring method of the projection optical system according to claim 1, wherein the diffraction grating is a pattern which is for use in semiconductor device manufacturing and which has periodicity in at least one direction.

5. The aberration measuring method of the projection optical system according to claim 1, wherein a plurality of the diffraction gratings are disposed in the finite region collectively exposed on the photomask, and the collective irradiation comprises: irradiating all the diffraction gratings formed in the finite region to project the lights on the same measurement plane.

6. The aberration measuring method of the projection optical system according to claim 1, further comprising: disposing a substrate whose surface is coated with a photosensitive agent in the measurement plane.

7. The aberration measuring method of the projection optical system according to claim 1, further comprising: disposing a light intensity detection unit which measures a light intensity distribution in the collectively exposed region in the measurement plane.

8. The aberration measuring method of the projection optical system according to claim 1, wherein the first and second measurement planes have plane symmetry with respect to a best focus position.

9. An aberration measuring method of a projection optical system, comprising:
preparing an exposure apparatus comprising a light source, an illuminating optical system which divides a light from the light source into a plurality of point sources to form a secondary light source and which guides an illuminating light from the secondary light source into a finite region of a photomask, and a projection optical system which transfers a reduced projected image of a transmitted light generated through a pattern disposed in the photomask onto a wafer;
collectively irradiating the finite region of the photomask in which a diffraction grating is formed with the illuminating light;
projecting a 0th-order diffracted light and 1st-order diffracted light passed through the photomask onto a first measurement plane conjugated with the secondary light source by using the projection optical system;
measuring a relation of projected positions in the first measurement plane between the 0th-order diffracted light and 1st-order diffracted light of the light emitted from one arbitrary point source in the secondary light source;
projecting the 0th-order diffracted light and 1st-order diffracted light onto a second measurement plane which is conjugated with the secondary light source and in which the position of the light of an optical axis direction is different by using the projection optical system;
measuring the relation of the projected positions of the second measurement plane between the 0th-order diffracted light and 1st-order diffracted light of the light emitted from the point source;
obtaining lay aberration concerning the light emitted from the point source on the basis of the obtained two relations of projected positions; and
obtaining wavefront aberration from the obtained lay aberration.

10. The aberration measuring method of the projection optical system according to claim 9, further comprising: obtaining the respective lay aberrations concerning a plurality of point sources; and obtaining the wavefront aberration from the obtained plurality of lay aberrations.

11. The aberration measuring method of the projection optical system according to claim 9, wherein the diffraction grating includes a periodic pattern in which a transmitted portion and shielded portion are repeated with a period p in:

$$\frac{\lambda}{NA(1+\sigma)\cdot M} < p < \frac{\lambda}{2NA\cdot\sigma\cdot M},$$

assuming that a magnification of the photomask is M, an exposure wavelength is λ, a numerical aperture on a projection side of the projection optical system is NA, and a coherence factor of the illuminating optical system is σ.

12. The aberration measuring method of the projection optical system according to claim 9, wherein the diffraction grating is a line and space pattern, square grating, or checkerboard grating.

13. The aberration measuring method of the projection optical system according to claim 9, wherein the diffraction grating is a pattern which is for use in semiconductor device manufacturing and which has periodicity in at least one direction.

14. The aberration measuring method of the projection optical system according to claim 9, wherein a plurality of the diffraction gratings are disposed in the finite region collectively exposed on the photomask, and the collective irradiation comprises: irradiating all the diffraction gratings formed in the finite region to project the lights on the same measurement plane.

15. The aberration measuring method of the projection optical system according to claim 9, further comprising: disposing a substrate whose surface is coated with a photosensitive agent in the measurement plane.

16. The aberration measuring method of the projection optical system according to claim 9, further comprising: disposing a light intensity detection unit which measures a light intensity distribution in the collectively exposed region in the measurement plane.

17. The aberration measuring method of the projection optical system according to claim 9, further comprising: obtaining the wavefront aberration using Zernike aberration coefficient.

18. The aberration measuring method of the projection optical system according to claim 9, wherein the first and second measurement planes have plane symmetry with respect to a best focus position.

* * * * *